(12) United States Patent
Zhang et al.

(10) Patent No.: US 11,960,549 B2
(45) Date of Patent: Apr. 16, 2024

(54) GUIDED SOURCE COLLECTION FOR A MACHINE LEARNING MODEL

(71) Applicant: Microsoft Technology Licensing, LLC, Redmond, WA (US)

(72) Inventors: Yu Zhang, Redmond, WA (US); Pankaj Sharma, Redmond, WA (US); Manish Shukla, North Bend, WA (US); Grigoriy A Orlov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 17/707,026

(22) Filed: Mar. 29, 2022

(65) Prior Publication Data
US 2023/0315792 A1    Oct. 5, 2023

(51) Int. Cl.
| | | |
|---|---|---|
| *G06F 7/02* | (2006.01) | |
| *G06F 16/00* | (2019.01) | |
| *G06F 16/951* | (2019.01) | |
| *G06F 16/9538* | (2019.01) | |
| *G06N 20/00* | (2019.01) | |

(52) U.S. Cl.
CPC ........ *G06F 16/951* (2019.01); *G06F 16/9538* (2019.01); *G06N 20/00* (2019.01)

(58) Field of Classification Search
CPC .... G06F 16/951; G06F 16/9538; G06N 20/00
See application file for complete search history.

(56) References Cited

U.S. PATENT DOCUMENTS

| 10,387,559 B1* | 8/2019 | Wendt | G06F 16/93 |
|---|---|---|---|
| 2021/0157867 A1* | 5/2021 | Bastide | G06F 16/9024 |
| 2023/0077130 A1* | 3/2023 | Matsuoka | H04L 67/306 |
| 2023/0139783 A1* | 5/2023 | Garib | G06N 3/044 |
| | | | 707/769 |

OTHER PUBLICATIONS

McCue, Colleen, "Domain Expertise," from Data Mining and Predictive Analysis, pp. 19-24, Elsevier Inc., 2007 (Year: 2007).*
McCallum, et al., "Building Domain-Specific Search Engines with Machine Learning Techniques", In Proceedings of the AAAI Spring Symposium on Intelligent Agents in Cyberspace, Mar. 1999, 12 Pages.
"International Search Report and Written Opinion Issued in PCT Application No. PCT/US22/054303", dated Mar. 16, 2023, 11 Pages.

* cited by examiner

*Primary Examiner* — Bruce M Moser
(74) *Attorney, Agent, or Firm* — Holzer Patel Drennan (57) ABSTRACT

Data is collected from a network graph, wherein the collected data is useful for training a machine learning model on a query domain. A domain-specific template corresponding to the query domain is received, the domain-specific template defining one or more classifiers to guide collection of content relevant to the query domain from the network graph. A collection starting point is analyzed based on the one or more classifiers of the domain-specific template to identify one or more relevant instances of the content. The one or more identified relevant instances of the content are added to a contextual protocol package. Each identified relevant instance of the content is analyzed based on the one or more classifiers of the domain-specific template to identify one or more additional relevant instances of the content. The one or more identified additional relevant instances of the content are added to the contextual protocol package.

20 Claims, 7 Drawing Sheets

GUIDED SOURCE COLLECTION FOR A MACHINE LEARNING MODEL

BACKGROUND

Machine learning (ML) applications process large amounts of input data, whether for the purpose of training a machine learning model or executing the trained machine learning model on unlabeled data. Such input data can be obtained through a variety of methods, often involving manual manipulation, such as manual labeling and filtering.

Web crawlers systematically browse data on the World Wide Web, collect enormous data sets from HTML pages and other Web content (collectively, "content"), and organize the data sets into a Web index to provide efficient data access for services, such as search engines. However, such web crawlers typically employ a brute force method of browsing the entire Web to collect and index input data for generic Web searches. As such, the input data from existing Web crawlers is likely to include data that is irrelevant to a specific ML application and further lacks contextual information about relationships among individual pages and content.

SUMMARY

The described technology provides for collecting data from a network graph, wherein the collected data is useful for training a machine learning model on a query domain. A domain-specific template corresponding to the query domain is received, the domain-specific template defining one or more classifiers to guide the collection of content relevant to the query domain from the network graph. A collection starting point is analyzed based on the one or more classifiers of the domain-specific template to identify one or more relevant instances of the content. The one or more identified relevant instances of the content are added to a contextual protocol package. Each identified relevant instance of the content is analyzed based on the one or more classifiers of the domain-specific template to identify one or more additional relevant instances of the content. The one or more identified additional relevant instances of the content are added to the contextual protocol package.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

A Web crawler can generate an index of Web content that can be searched by a search engine. However, the Web crawler tends to use a brute-force method of browsing the Web and developing an index of all of the generic content found by the crawler. For example, a Web crawler may exhaustively crawl a network graph representing the entire accessible Web. Furthermore, the content in the index tends to be allocated to individual Web pages and documents, and no semantic relationships among individual instances of content are preserved or recorded.

Furthermore, Web search engines can search a Web crawler-generated index of Web content for use in a generic search application, but such generically generated indexes are inadequate for modern ML-based applications. For example, a user wishes to learn "how do I build a new kitchen," so the user enters potential search terms into a Web search engine query, such as appliance type, appliance brand, flooring options, construction options, etc. The search engine pre-processes the query or queries to develop search keywords, searches the generic Web index for the search keywords, and returns ranked matches relating to Web pages and content from the index. It is left for the user to evaluate the matched pages and content, filter out less helpful results, develop supplemental search queries, etc. In one view, the Web crawler builds an omnibus index of content, and the search engine simply searches for keywords developed from a user-provided query, which requires the user to review, supplement, and process the search results in an effort to answer the question "how do I build a new kitchen."

In contrast, the described technology addresses many of the disadvantages of the generic brute force index to improve the performance and accuracy in ML-based processing of queries. Rather than providing a search query to generate search keywords, such as appliance types and brands, the user can simply ask the ML-based service, "how do I build a new kitchen?" The ML-based service includes a selection of domain-specific ML models that have been trained using domain-specific indexes of content collected by a collector of the described technology. These indexes are generated by browsing content according to domain-specific templates that define classifiers tuned to discover the types of content and relationships among the content in the collection of relevant training data that is to be used to train domain-specific ML models. In this manner, each domain-specific ML model is trained with types of content and relationships among the content associated with a query domain and further returns a solution that is more than just selections of product pages. Instead, the corresponding template allows the service to collect relevant content that goes beyond the limited keywords and into the meaning behind the query. As such, when a user asks the ML-based service "how do I build a new kitchen," the service identifies the domain(s) of the query (e.g., kitchen building, kitchen DIY), selects a domain-specific ML model that has been trained by content according to the corresponding domain-specific template, and executes the kitchen building query through the selected ML model. Accordingly, the domain-specific ML model is likely to return, in addition to product pages, a selection of associated appliance specification sheets, product reviews, installation instructions, product reviews, related products to be considered in a kitchen building project, etc.

Figure 1:
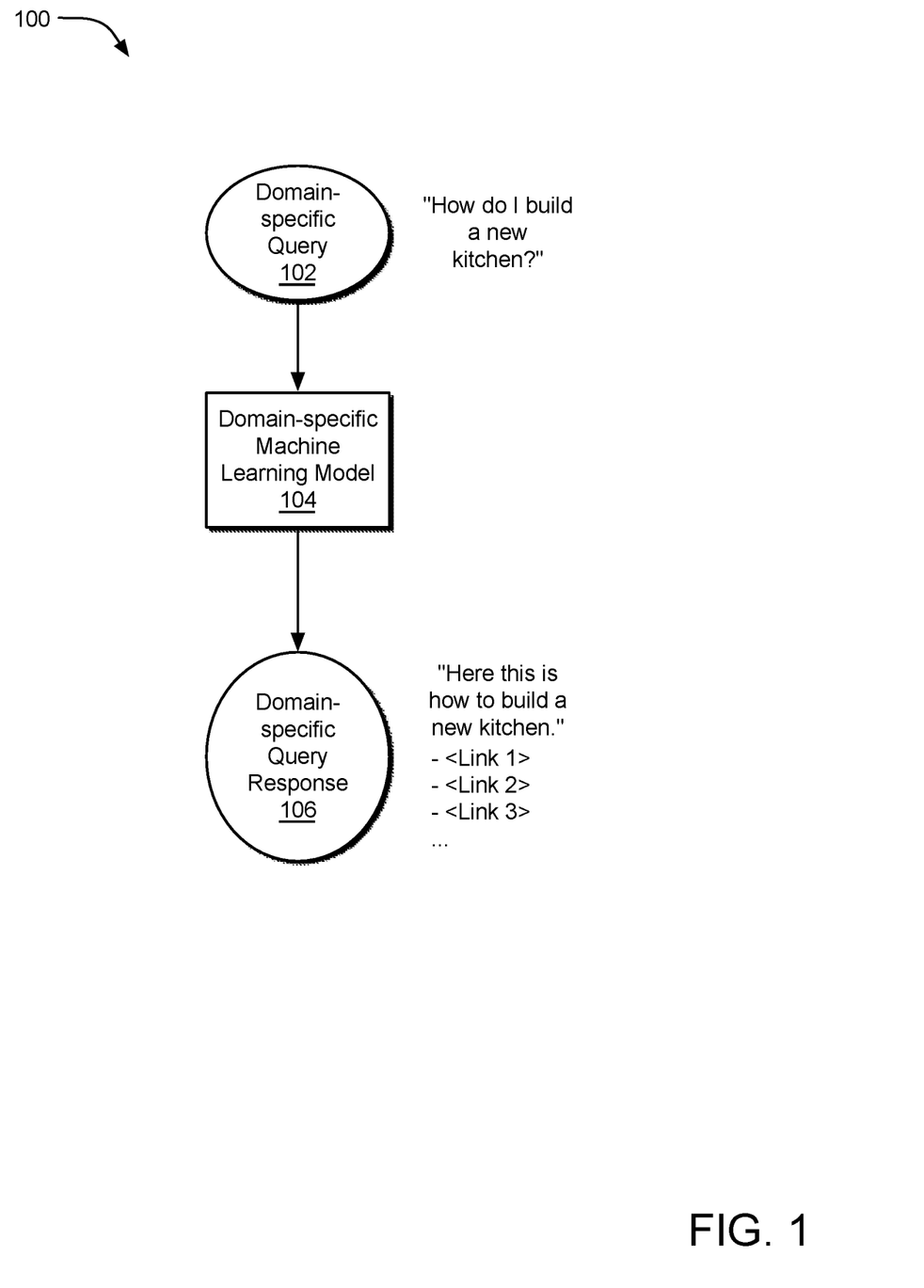
FIG. 1 illustrates an example domain-specific machine learning model system for processing a domain-specific query.

FIG. 1 illustrates an example domain-specific machine learning model system 100 for processing a domain-specific query 102. The domain-specific query 102 (i.e., "How do I build a new kitchen?") is input to a domain-specific ML model 104, which has been specially trained with domain-specific content collected by an automated collector based on one or more domain-specific templates. In this manner, the domain-specific ML model 104 is trained using automatically-collected domain-specific training data rather than generic Web data. Even high-quality ML models can be crippled when trained by inadequate, inaccurate, or irrelevant data in the early training stages. In contrast, by training the domain-specific ML model 104 using domain-specific training data, the domain-specific ML model 104 receives high-quality training data that is considered relevant to the query domain to which the domain-specific ML model 104 is associated. Accordingly, the domain-specific ML model 104 is more capable of providing an accurate domain-specific query response 106 (i.e., "Here this is how to build a new kitchen") that includes more relevant links and/or references to the content identified by the domain-specific ML model 104 in response to processing the domain-specific query 102.

It is assumed that the domain-specific ML model 104 has been trained based on training data collected by an automated collector (not shown). The domain-specific collector reads one or more domain-specific templates that define one or more classifiers associated with the query domain. The classifiers provide guidance to the collector for discovering and recording potentially relevant data to the query domain. The collector includes one or more crawlers that are capable of navigating through a network graph based on one or more domain-specific templates. Rather than simply crawling through every instance of Web content available, the collector uses the classifiers defined in the domain-specific template to identify promising "leads" in one instance of crawled content and then follows that lead to expanding the crawling to content that is believed to be relevant to the query domain. As a result, the collector performs a guided collection through the network graph and its contents. The collected data is then used as training data to train a domain-specific ML model 104.

As suggested above, some domain-specific queries can be associated with multiple query domains. For example, a query "How do I build a smart home?" may be associated with the query domains of "smart devices" and "home building." In this context, an automated collector may read domain-specific templates for both query domains to guide its crawl through a network graph as it collects content that is relevant to both query domains. In a training stage, the content collected with reference to each domain-specific template may be indexed together or separately and input to an ML model for training purposes. After training, when an ML service receives a query, the ML service determines one or more query domains associated with the query, selects one or more domain-specific ML models to process the query, and submits the query to the one or more selected domain-specific ML models, which generate a response including a selection of content deemed relevant to the query.

Figure 2:
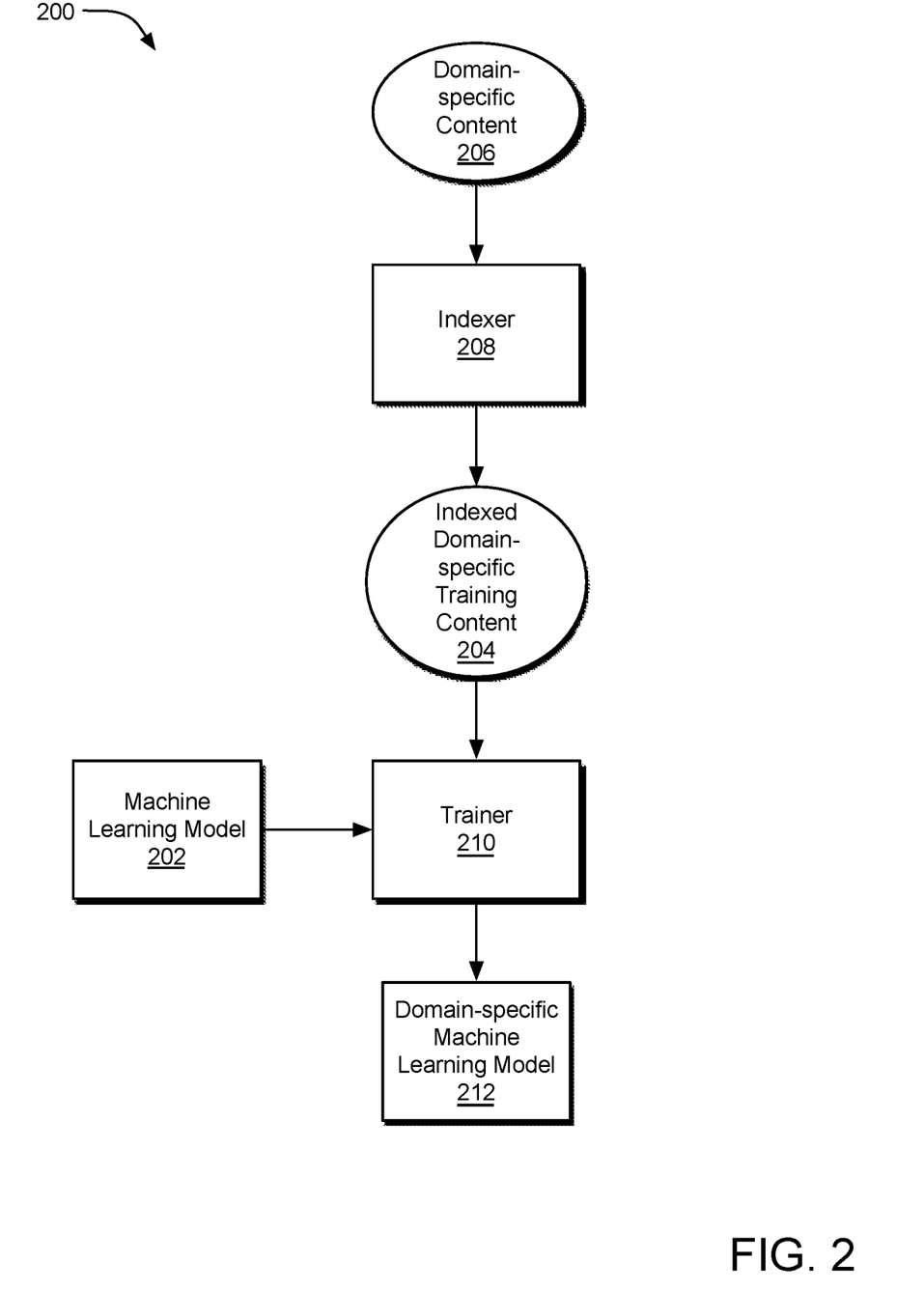
FIG. 2 illustrates an example training system for a machine learning model using indexed domain-specific training content.

FIG. 2 illustrates an example training system 200 for a machine learning model 202 using indexed domain-specific training content 204. Domain-specific content 206 has been collected by an automated collector (not shown) based on one or more domain-specific templates (not shown). The domain-specific content 206 is indexed by an indexer 208 to improve the efficiency at which the domain-specific content 206 may be accessed. Indexing is the computerized process of scanning large volumes of data content against a controlled vocabulary, taxonomy, thesaurus, or ontology and using those controlled terms to quickly and effectively index a large corpus of content (e.g., large electronic document depositories, Web pages). For example, a simple index may characterize each document based on the frequency that various terms appear in the document. In this example, a document may be considered more relevant to terms that appear more frequently compared to other terms. In some implementations, the indexer 208 may index the domain-specific content 206 according to various indexing schemes, including without limitation an alphabetical index, a metadata index, a taxonomy index, and/or a combination thereof. Thus, the indexer 208 indexes the domain-specific content 206 to generate the indexed domain-specific training content 204.

A trainer 210 then uses the indexed domain-specific training content 204 to train the machine learning model 202. Training an ML model means determining good values for the weights and the bias in the ML algorithm from labeled examples, which constitute the training data. In supervised learning, for example, a machine learning algorithm trains a model by examining many examples of labeled data and attempting to find a model that minimizes loss, a process called empirical risk minimization. Other training approaches may be employed. However, the quality and quantity of the training data can impact the accuracy of the ML model performance—bad training data, including training data with a large amount of irrelevant data, can train a poor-performing ML model. The described technology guides the automated collection of training data for a specific query domain, so that the domain-specific ML model resulting from the training is more accurate and/or faster than a generically trained ML model. Furthermore, guided automated collection of training data also facilitates the collection of domain-specific training data for a large volume of domain-specific ML models. As shown in FIG. 2, the trainer 210 trains the machine learning model 202 using indexed domain-specific training content 204, thereby resulting in a domain-specific machine learning model 212.

Figure 3:
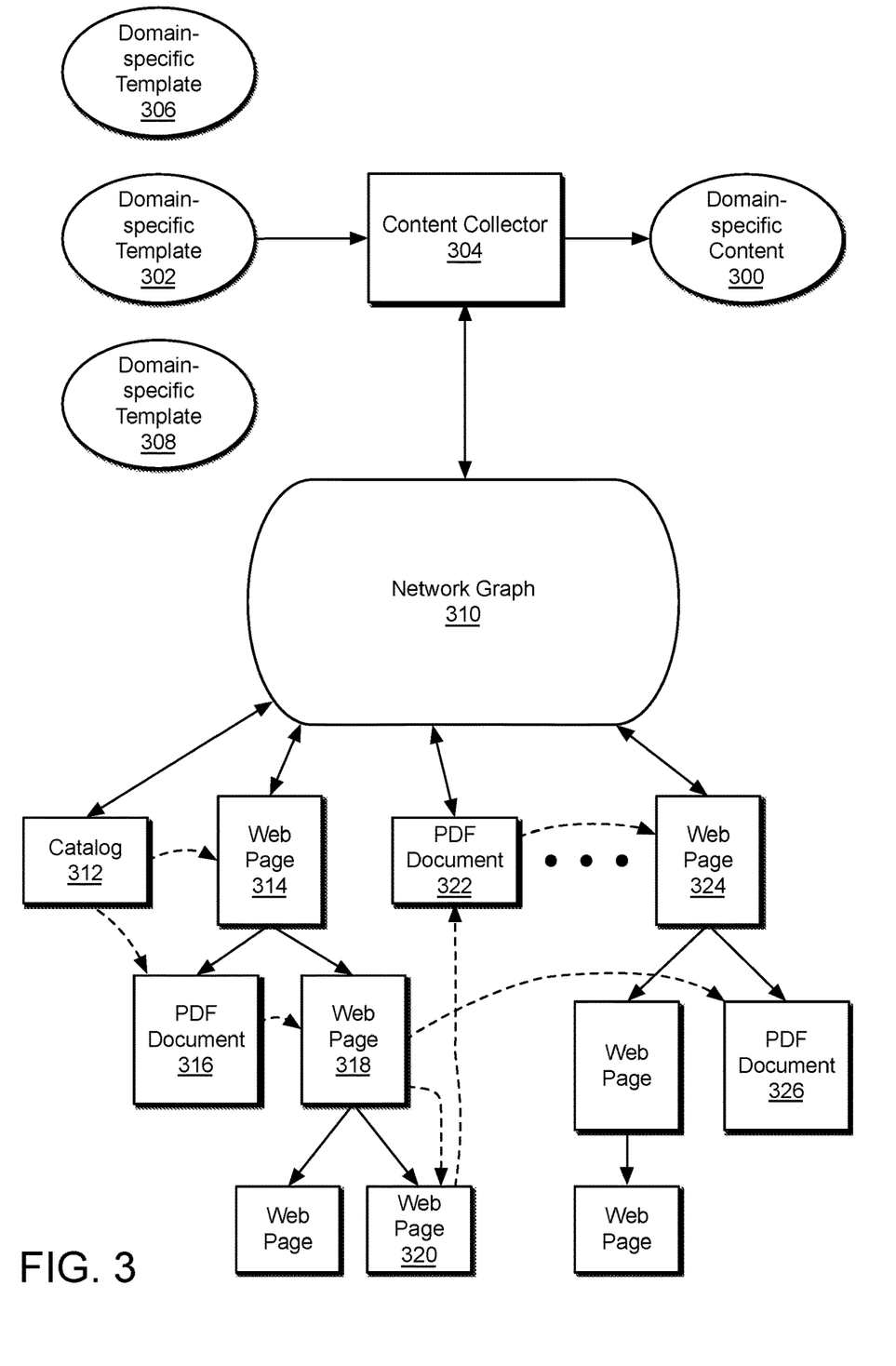
FIG. 3 illustrates an example collection of domain-specific content based on a domain-specific template.

FIG. 3 illustrates an example collection of domain-specific content 300 based on a domain-specific template 302. A content collector 304 can access one or more domain-specific templates (e.g., the domain-specific template 302, a domain-specific template 306, and a domain-specific template 308), each template relating to a specific query domain. In FIG. 3, the content collector 304 reads the domain-specific template 302, which is associated with a specific query domain, and defines one or more classifiers associated with that query domain.

A domain-specific template defines one or more classifiers that guide the collection of content expected to be relevant to the specific query domain. Generally, an example implementation of a domain-specific template defines, for each classifier, a data source, a data type, keywords associated with the type of data source, an algorithm for processing the data source, a weight applied to this type of data source, semantic characteristics, and an extractor. In one implementation, the domain-specific template also defines a starting point or a method of identifying a starting point (e.g., in a network graph or document) for the content collector 304.

In one implementation, an example domain-specific template for the query domain "security solutions for finance" includes the following information:

[title: security solutions for finance]
[classifiers:
  {C1: DataSource: Catalog; Data type: string; keywords:Description; algorithm:NLP; SimilarWeight: 0.85; Semantic:Security,Finance; Extractor: Product Id, Name}
  {C2: DataSource: Web Site; Data type: URL; keywords:UseCase; algorithm:NLP; SimilarWeight:0.80; Semantic:Support,Reference,UserStory; Extractor: Product Id, Name }
  {C3: DataSource: PDF; Data type: File|URL; keywords:ProductionMenu; algorithm:NLP; SimilarWeight:0.60; Semantic:Diagram,Integration ; Extractor: Product Id, Name }
]
[entry: {endpoint: catalog api/ . . . ..; query=searchall}]

The last line of the domain-specific template above defines a method of identifying an entry end point (e.g., a collection starting point) at which a crawler of the content collector 304 is to start its collection. In the example above, the entry endpoint may be identified via an API (Application Programming Interface) call, which returns an instance of catalog content provided by a user intended to execute the content collector 304 to generate a contextual protocol package of training data for use in training a machine learning model for the query domain "security solutions for finance." Alternatively, the collection starting point may be provided as an instance of content, a link to an instance of content, etc.

The various parameters for each classifier in the example implementation presented above may be characterized as follows:

Keywords: string categorization for an exact or semantic match (e.g., "Description" specified a list of terms to search near or at the start of a paragraph of text in the data source, such as "description," "following section describes," "summary," and/or other defined string characterizations suggesting a product description)

Algorithm: the matching algorithm assigned for the corresponding classifier (e.g., NLP—natural language processing, semantics matching; SM—string matching SimilarWeight: a predetermined score threshold to determine whether the matching result qualifies as relevant or not (e.g., if SimilarWeight=0.8 and the actual matching/similarity score=0.7, then the source is deemed "not relevant")

Semantic: matching data qualifier (e.g., "diagram" means looks for instances of content with name/content containing value/name of "diagram")

Extractor: the information to be extracted out of the data source (e.g., "ProductId" searches and extracts a string matching "Product ID" or other product-id-related terms, and a subsequent text token or value)

The first classifier C1 is parametrized for evaluating a catalog data source of type string, so the collection starting point of a catalog will trigger this classifier. The classifier C1 uses a natural language processing (NLP) algorithm to evaluate the catalog string, which includes the text of the catalog, and searches for keywords, such as "Description." The keywords parameter informs the crawler to search for specified keywords in the catalog that are likely to lead to relevant content. For the classifier C1, the collector will search for the keyword "Description" and extract the product identifier and the description text. The SimilarWeight parameter defines a relevancy threshold that sets a relevancy condition. If relevancy of the evaluated product identifier, product name, and the description text (e.g., as determined by a similarity score or other relevancy analysis) to the query domain exceeds the SimilarWeight threshold of 0.85 on a scale of 0 to 1, then the product identifier and the description text is deemed relevant to the query domain and is added to the contextual protocol package.

The content collector 304 also attempts to apply the second classifier C2 to the catalog. The classifier C2 is parametrized for evaluating a Web site data source of type URL. The classifier C2 uses a natural language processing algorithm to evaluate the content of the catalog, searching for Use-Case-related keywords (such as "Use Case," "example", etc.) and a URL and extracting the product identifier, the description text, and the URL. The SimilarWeight parameter defines a relevancy threshold that sets a relevancy condition. If relevancy of the evaluated product identifier, product name, and the URL (e.g., as determined by a similarity score or other relevancy analysis) to the query domain exceeds the SimilarWeight threshold of 0.80 on a scale of 0 to 1, then they are deemed relevant to the query domain and is added to the contextual protocol package.

The content collector 304 also attempts to apply the third classifier C3 to the catalog. The classifier C3 is parametrized for evaluating the catalog to identify a PDF data source of type File or URL referenced in the catalog. The classifier C3 uses a natural language processing algorithm to evaluate the content of the catalog, searching for production-menu-related keywords (such as "Production Menu", "specification", etc.) and extracting the product identifier, the description text, and the file pointer or URL. The SimilarWeight parameter defines a relevancy threshold that sets a relevancy condition. If relevancy of the evaluated product identifier, product name, and the file pointer or URL (e.g., as determined by a similarity score or other relevancy analysis) to the query domain exceeds the SimilarWeight threshold of 0.60 on a scale of 0 to 1, then they are deemed relevant to the query domain and is added to the contextual protocol package.

The application of the classifiers, as explained above, is then applied to the extracted content (e.g., the product identifiers, product names, descriptions, and content identified by the URLs/file pointers). The content collector 304, therefore, iterates through each newly classified relevant content, reapplying the classifiers defined in the domain-specific template 302 to discover new levels of relevant content. In one implementation, the iterations continue until the content collector 304 finds no additional content instances that satisfy the corresponding relevancy conditions for each classifier.

Turning back to FIG. 3, the content collector 304 access the network graph 310 to analyze the collection starting point identified in the domain-specific template 302, which in this case is the catalog 312. The classifier C1 is used to analyze the content of the catalog 312, extracting the product identifiers, product names, and descriptions subject to a relevancy condition. Relevant extracted content is stored in a contextual protocol package (now shown but managed and/or accessible by the content collector 304), which incrementally stores the collected relevant content. The classifiers C2 and C2 are also used to analyze the content of the catalog 312 to identify additional potentially relevant content.

In the example shown in FIG. 3, a Web page 314 and a PDF document 316 were identified from the catalog 312 by the classifiers, so the content collector 304 then iterates the classifiers on the content of the Web page 314 and the PDF document 316 to discover new levels of potentially relevant content. For the purposes of this example, the Web page 314 is analyzed by the classifiers, and any relevant content is extracted into the contextual protocol package. However, no additional relevant content sources are identified by the classifiers within the Web page 314. In contrast, the classifiers identify at least one additional relevant content source in the PDF document 316, namely the Web page 318. The content collector 304 iterates through each discovered source to discover the Web page 320, the PDF document 322, the Web page 324, and the PDF document 326. These iterations continue until no further relevant sources are discovered. After completion of the iterations, the contextual protocol package contains the collected relevant content to the query domain, which is then used to train a domain-specific ML model for the query domain.

It should be noted that some content in the network graph is not collected, whether because it does not satisfy a relevancy condition to the query domain or because no leads to that content were discovered by the classifiers. In this way, non-relevant content is omitted from the training data, thereby resulting in an ML model trained for the given query domain.

Domain-specific templates can be generated for different types of query domains. The template listed above is directed to security solutions for financial applications. Other examples may include without templates for building a kitchen, smart homes, auto repair, and document management. Each template would be configured with parameters associated with the specific query domain. For example, a classifier C4 for a smart homes query domain may be defined as follows:

{C4: DataSource: Catalog; Data type: string; keywords: Description; algorithm:NLP; SimilarWeight:0.80; Semantic:IoT,SmartHomes; Extractor: Product Id, Name}

The content collector 304, therefore, collects domain-specific content (based on one or more domain-specific templates) as training data to train a domain-specific ML model. Then, the trained domain-specific ML model can be used to answer domain-specific queries, such as "how do I deploy security applications for a financial business?" Because the training of the domain-specific ML model is based on guided collection of domain-specific content, the domain-specific ML model is expected to perform more accurately and more efficiently than a generically-trained ML model. Furthermore, because the domain-specific training data is automatically collected based on the domain-specific template(s), manual involvement does not limit or slow the number and quality of domain-specific ML models that can be generated and trained for such applications.

Figure 4:
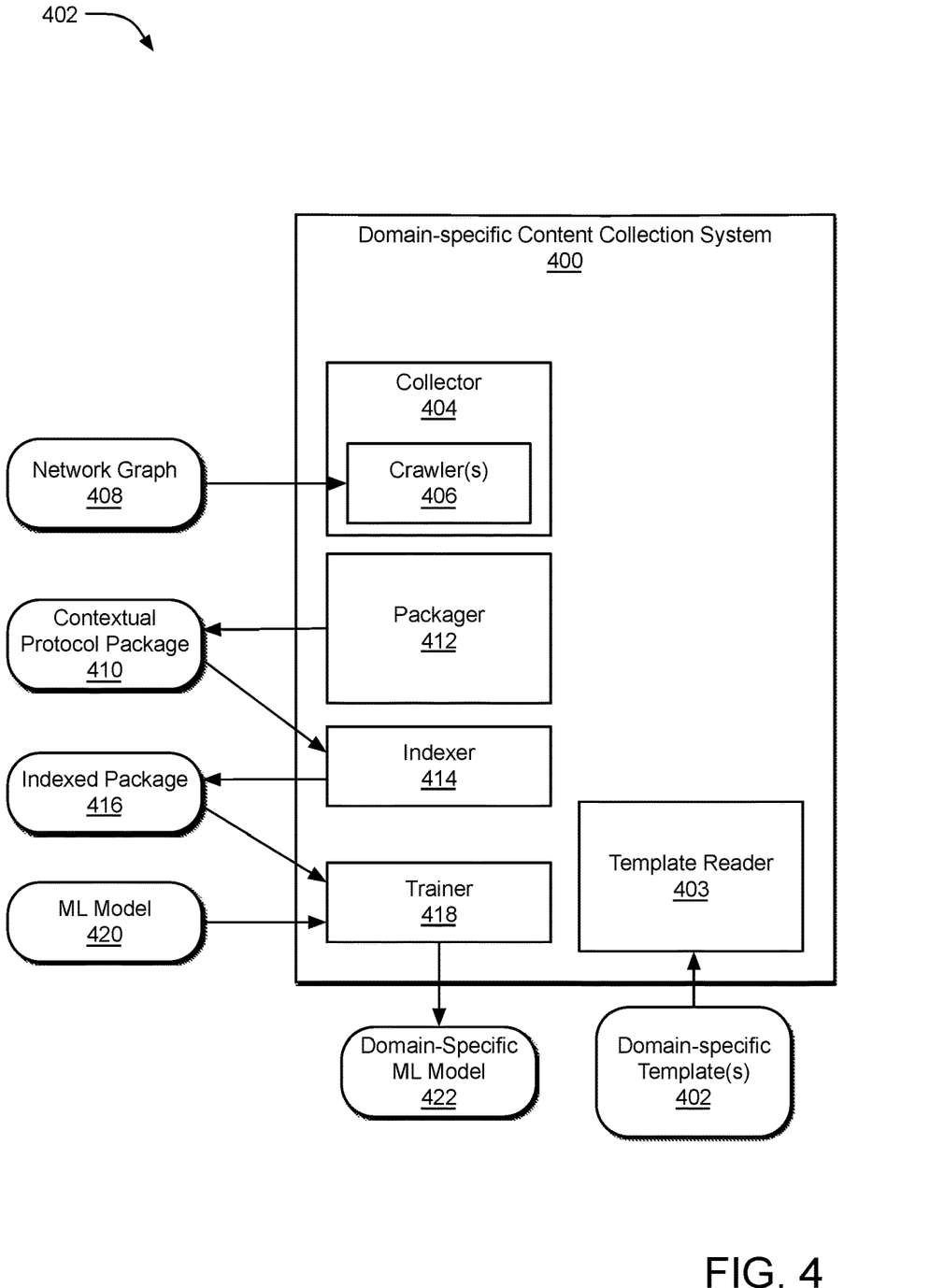
FIG. 4 illustrates an example domain-specific content collection system.

FIG. 4 illustrates an example domain-specific content collection system 400. The domain-specific content collection system 400 performs automated collection of domain-specific content, as guided by one or more domain-specific templates 402 ingested by a template reader 403. The domain-specific content collection system 400 includes a collector 404 that uses a crawler 406 to navigate a network graph 408 in search of relevant training content for a query domain defined in association with the one or more domain-specific templates 402.

In contrast to generic Web crawlers, which typically navigate to individual Web content based only on the network graph, the crawler 406 navigates to new content based on the content pointers (e.g., product names, URLs, file pointers) extracted by the classifiers of the one or more domain-specific templates 402 into a contextual protocol package 410. Accordingly, if a catalog description includes a reference to a product support forum URL, which is extracted into the contextual protocol package 410 for the query domain, the crawler 406 will then navigate to the content at the product support forum URL in a subsequent iteration and apply the corresponding classifiers to the content of the forum. Furthermore, new content pointers may be extracted from the forum and stored in the contextual protocol package 410 so that the crawler 406 can navigate to them in a subsequent iteration.

The contextual protocol package 410 is accumulated by a packager 412, which loads content and/or content pointers into the contextual protocol package 410 as they are deemed relevant to the query domain. After the iterations are complete, the contextual protocol package 410 is indexed by an indexer 414 to generate an indexed package 416. A trainer 418 receives the indexed package 416 as training data to train an ML model 420 into a domain-specific ML model 422.

Figure 5:
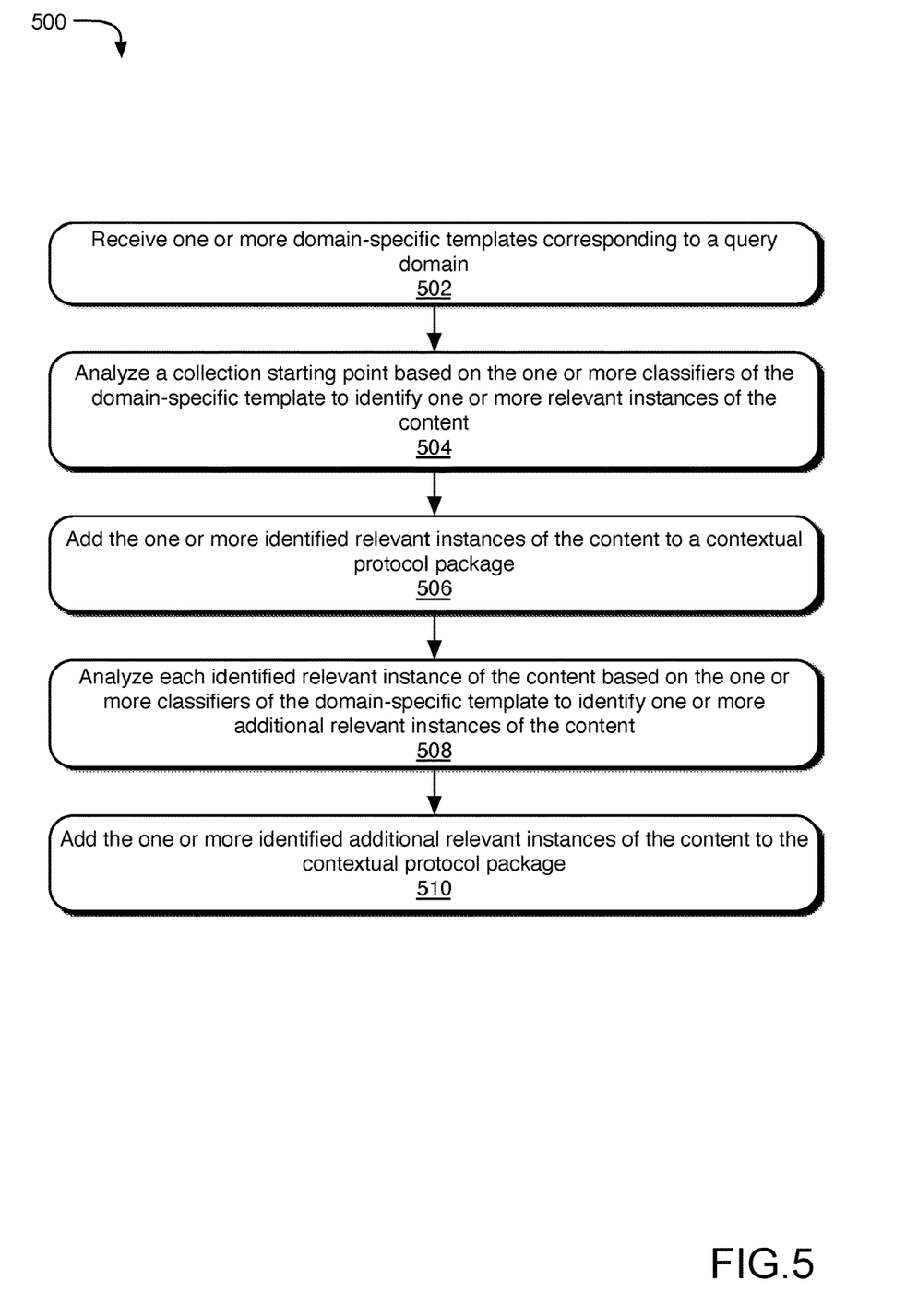
FIG. 5 illustrates example operations for collecting domain-specific content.

FIG. 5 illustrates example operations 500 for collecting domain-specific content. A receiving operation 502 receives one or more domain-specific templates corresponding to a query domain. An analysis operation 504 analyzes a collection starting point based on the one or more classifiers of the domain-specific template to identify one or more relevant instances of the content. A packaging operation 506 adds the one or more identified relevant instances of the content to a contextual protocol package.

Another analysis operation 508 analyzes each identified relevant instance of the content based on the one or more classifiers of the domain-specific template to identify one or more additional relevant instances of the content. Another packaging operation 510 adds the one or more identified additional relevant instances of the content to the contextual protocol package.

Figure 6:
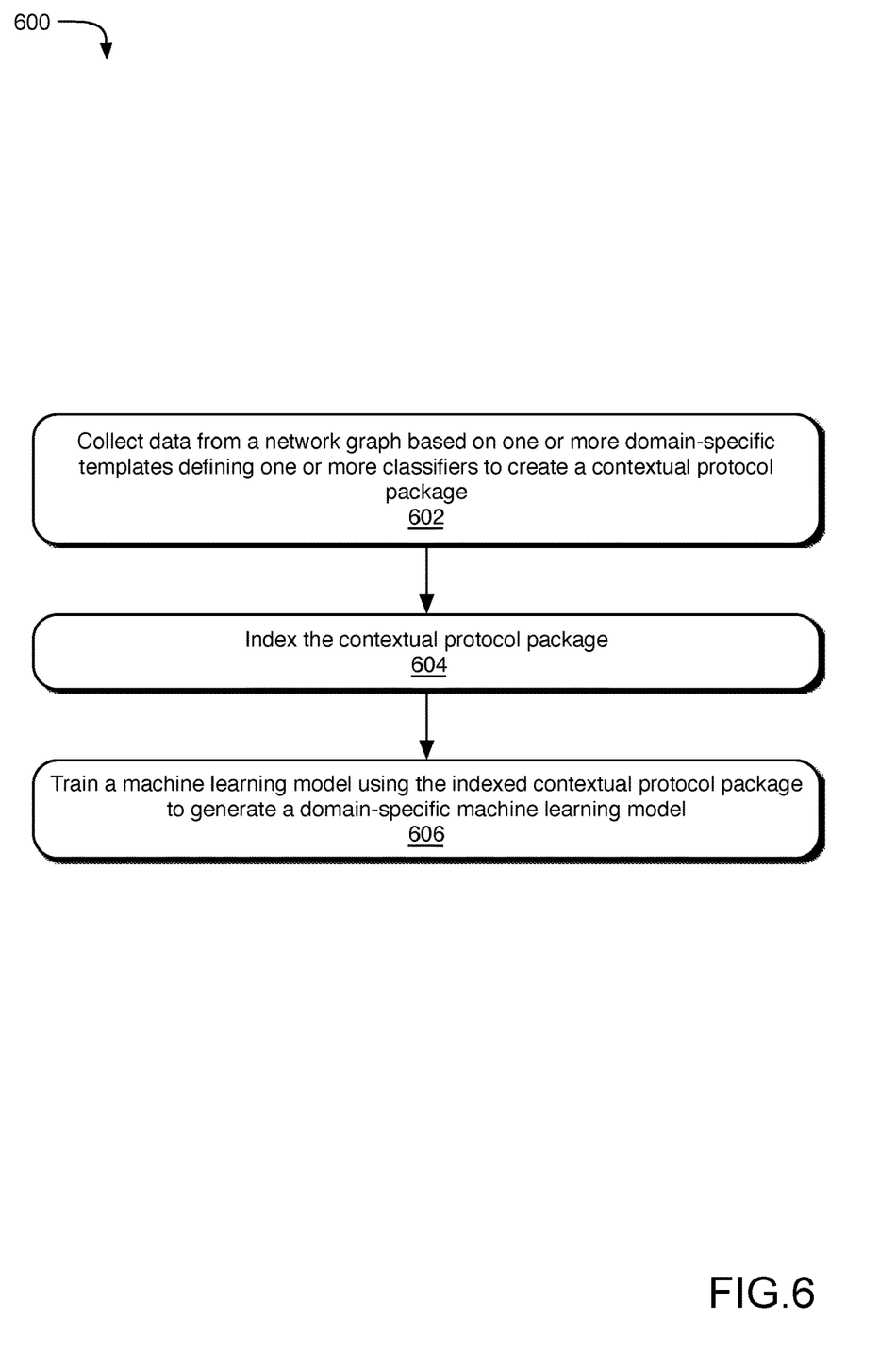
FIG. 6 illustrates example operations for training a machine learning model with domain-specific training content.

FIG. 6 illustrates example operations 600 for training a machine learning model with domain-specific training content. A collection operation 602 collects data from a network graph based on one or more domain-specific templates defining one or more classifiers to create a contextual protocol package. An indexing operation 604 indexes the contextual protocol package. A training operation 606 trains a machine learning model using the indexed contextual protocol package to generate a domain-specific machine learning model.

Figure 7:
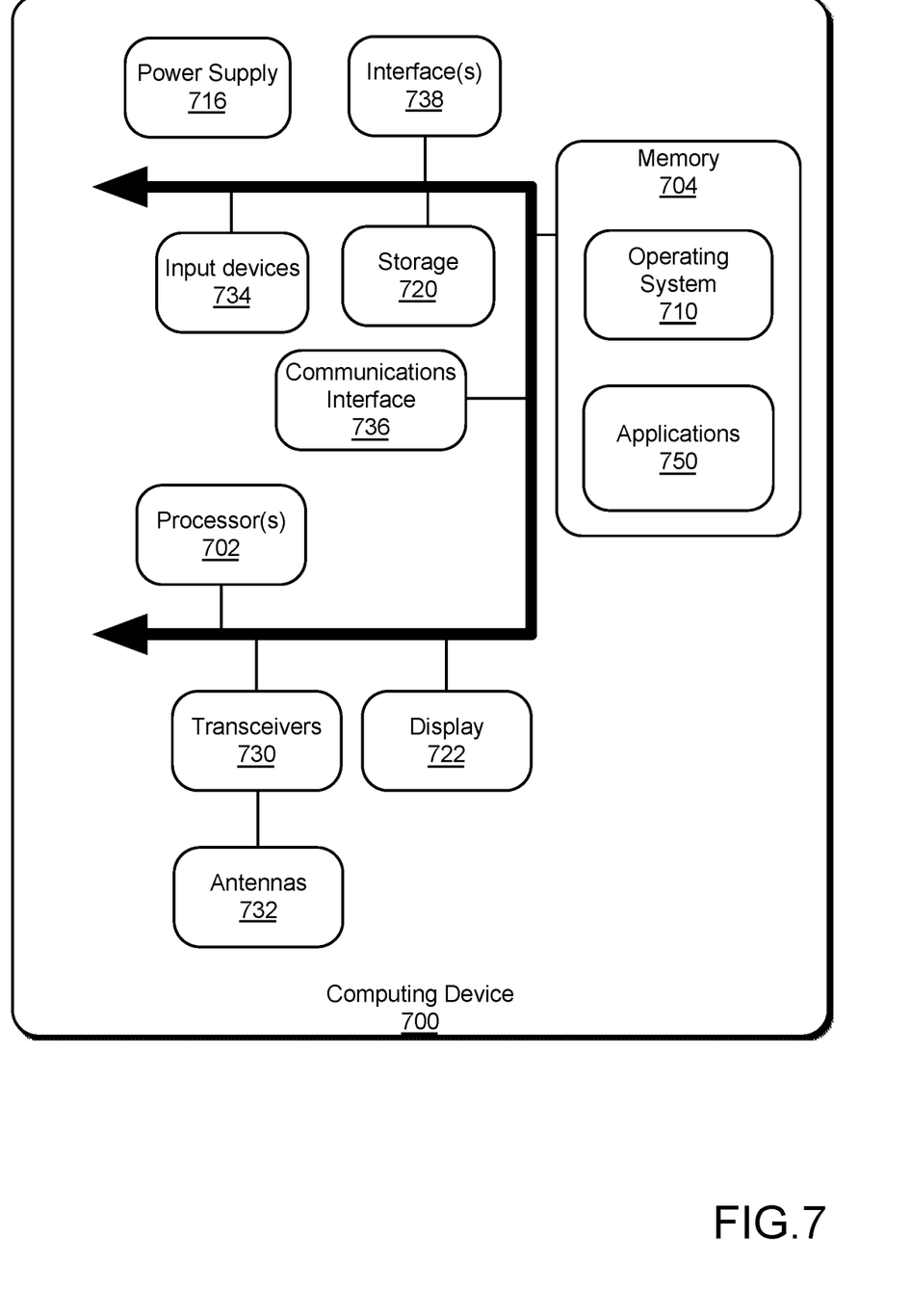
FIG. 7 illustrates an example computing device for use in collecting domain-specific training data and/or training a machine learning model using domain-specific training data.

FIG. 7 illustrates an example computing device for use in collecting domain-specific training data and/or training a machine learning model using domain-specific training data. The computing device 700 may be a client device, such as a laptop, mobile device, desktop, tablet, or a server/cloud device. The computing device 700 includes one or more processor(s) 702, and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, all or part of a content collector, a packager, an indexer, a trainer, a template reader, a crawler, and other modules are loaded into the operating system 710 on the memory 704 and/or storage 720 and executed by processor(s) 702. The storage 720 may store domain-specific templates, a contextual protocol package, relevant content instances, network graphs, ML models, and other data and be local to the computing device 700 or may be remote and communicatively connected to the computing device 700. In one implementation, a display controller, a sensor controller, a communications interface, and/or a timing generator may include circuitry to perform intended functions. In particular, in one implementation, components of the content collection system may be implemented entirely in hardware or in a combination of hardware circuitry and software.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of communication device. The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of collecting data from a network graph is provided, wherein the collected data is useful for training a machine learning model on a query domain. The example method includes receiving a domain-specific template corresponding to the query domain, with the domain-specific template defining one or more classifiers to guide collection of content relevant to the query domain from the network graph. The example method also includes analyzing a collection starting point based on the one or more classifiers of the domain-specific template to identify one or more relevant instances of the content, adding the one or more identified relevant instances of the content to a contextual protocol package, analyzing each identified relevant instance of the content based on the one or more classifiers of the domain-specific template to identify one or more additional relevant instances of the content, and adding the one or more identified additional relevant instances of the content to the contextual protocol package. One or more technical benefits of this approach may include developing a more relevant and more focused set of training data directed to a specific query domain, as compared to unguided collection, manually guided collection, merely filtered collection, etc. An automated implementation may also allow the use of domain-specific ML models to scale to a large number of query domains.

Another example method of any preceding method is provided, wherein the operation of analyzing the collection starting point includes analyzing the collection starting point based on the one or more classifiers of the domain-specific template to identify one or more instances of the content and evaluating each identified instance of the content against one or more relevancy conditions to identify the one or more relevant instances of the content. One or more technical benefits of this approach may include allowing a user to provide an instance of content as a starting point for collection. As such, a user can guide or focus the collection by providing, as a starting point, relevant content with rich leads to additional relevant content.

Another example method of any preceding method is provided, wherein the operation of analyzing each identified relevant instance of the content includes analyzing each identified relevant instance of the content based on the one or more classifiers of the domain-specific template to identify one or more additional instances of the content and evaluating each identified additional instance of the content against one or more relevancy conditions to identify the one or more additional relevant instances of the content. One or more technical benefits of this approach may include automated relevancy testing of individual instances of content.

Another example method of any preceding method is provided, further including iterating through multiple stages of analyzing and adding directed to one or more additional instances of the content to identify an additional set of one or more additional relevant instances of the content and to add them to the contextual protocol package and terminating the iterating based on a determination that the one or more additional instances of the content identified in a stage of analyzing and adding failed to satisfy one or more relevancy conditions. One or more technical benefits of this approach may include automated relevancy testing of individual instances of content and stopping the collection when no additional relevant instances of content are found.

Another example method of any preceding method is provided, further including training the machine learning model using the contextual protocol package as training data. One or more technical benefits of this approach may include training the machine learning model with an automatically-collected instance of content that is relevant to a given query domain, making for a more accurate/more efficient model.

Another example method of any preceding method is provided, further including indexing the contextual protocol package and training the machine learning model using the indexed contextual protocol package as training data. One or more technical benefits of this approach may include accelerating the training of the machine learning model by inputting indexed training data.

Another example method of any preceding method is provided, further including receiving a query directed to the query domain and submitting the query to the machine learning model, wherein the machine learning model is trained using the contextual protocol package generated based on the domain-specific template. One or more technical benefits of this approach may include using a domain-specific machine learning model to process a query from a corresponding query domain—this correspondence between the query domain and the domain-specific machine learning model for that query domain can increase accuracy and efficiency in processing the query in this model.

An example system for collecting data from a network graph is provided, wherein the collected data is useful for training a machine learning model on a query domain. The example system includes one or more hardware processors and a template reader executable by the one or more hardware processors and configured to read a domain-specific template corresponding to the query domain, with the domain-specific template defining one or more classifiers to guide collection of content relevant to the query domain from the network graph. The example system also includes a collector executable by the one or more hardware processors and configured to analyze a collection starting point based on the one or more classifiers of the domain-specific template to identify one or more relevant instances of the content, with the collector being further configured to analyze each identified relevant instance of the content based on the one or more classifiers of the domain-specific template to identify one or more additional relevant instances of the content, and a packager executable by the one or more hardware processors and configured to add the one or more identified relevant instances of the content to a contextual protocol package and to add the one or more identified additional relevant instances of the content to the contextual protocol package.

Another example system of any preceding system is provided, wherein the collector is configured to analyze the collection starting point based on the one or more classifiers of the domain-specific template to identify one or more instances of the content and to evaluate each identified instance of the content against one or more relevancy conditions to identify the one or more relevant instances of the content.

Another example system of any preceding system is provided, wherein the collector is configured to analyze each identified relevant instance of the content based on the one or more classifiers of the domain-specific template to identify one or more additional instances of the content and to evaluate each identified additional instance of the content against one or more relevancy conditions to identify the one or more additional relevant instances of the content.

Another example system of any preceding system is provided, wherein the collector is further configured to iterate through multiple stages of analyzing and adding directed to one or more additional instances of the content to identify an additional set of one or more additional relevant instances of the content and to add them to the contextual protocol package and to terminate the iterating based on a determination that the one or more additional instances of the content identified in a stage of analyzing and adding failed to satisfy one or more relevancy conditions.

Another example system of any preceding system is provided, further including a trainer executable by the one or more hardware processors and configured to train the machine learning model using the contextual protocol package as training data.

Another example system of any preceding system is provided, further including an indexer executable by the one or more hardware processors and configured to index the contextual protocol package and a trainer executable by the one or more hardware processors and configured to train the machine learning model using the indexed contextual protocol package as training data.

Another example system of any preceding system is provided, further including a query processor executable by the one or more hardware processors and configured to receive a query directed to the query domain and to submit the query to the machine learning model, wherein the machine learning model is trained using the contextual protocol package generated based on the domain-specific template.

One or more examine tangible processor-readable storage media embodied with instructions for executing on one or more processors and circuits of a computing device a process for collecting data from a network graph are provided, wherein the collected data is useful for training a machine learning model on a query domain. The process includes receiving a domain-specific template corresponding to the query domain, with the domain-specific template defining one or more classifiers to guide collection of content relevant to the query domain from the network graph, analyzing a collection starting point based on the one or more classifiers of the domain-specific template to identify one or more relevant instances of the content, adding the one or more identified relevant instances of the content to a contextual protocol package, analyzing each identified relevant instance of the content based on the one or more classifiers of the domain-specific template to identify one or more additional relevant instances of the content, and adding the one or more identified additional relevant instances of the content to the contextual protocol package.

One or more other example tangible processor-readable storage media of any preceding media is provided, wherein the operation of analyzing the collection starting point includes analyzing the collection starting point based on the one or more classifiers of the domain-specific template to identify one or more instances of the content and evaluating each identified instance of the content against one or more relevancy conditions to identify the one or more relevant instances of the content.

One or more other example tangible processor-readable storage media of any preceding media is provided, wherein the operation of analyzing each identified relevant instance of the content includes analyzing each identified relevant instance of the content based on the one or more classifiers of the domain-specific template to identify one or more additional instances of the content and evaluating each identified additional instance of the content against one or more relevancy conditions to identify the one or more additional relevant instances of the content.

One or more other example tangible processor-readable storage media of any preceding media is provided, wherein the process further includes iterating through multiple stages of analyzing and adding directed to one or more additional instances of the content to identify one or more additional relevant instances of the content and to add them to the contextual protocol package and terminating the iterating based on a determination that the one or more additional instances of the content identified in a stage of analyzing and adding failed to satisfy one or more relevancy conditions.

One or more other example tangible processor-readable storage media of any preceding media is provided, wherein the process further includes training the machine learning model using the contextual protocol package as training data.

One or more other example tangible processor-readable storage media of any preceding media is provided, wherein the process further includes receiving a query directed to the query domain and submitting the query to the machine learning model, wherein the machine learning model is trained using the contextual protocol package generated based on the domain-specific template.

An example system of collecting data from a network graph is provided, wherein the collected data is useful for training a machine learning model on a query domain. The example system includes means for receiving a domain-specific template corresponding to the query domain, with the domain-specific template defining one or more classifiers to guide collection of content relevant to the query domain from the network graph. The example system also includes means for analyzing a collection starting point based on the one or more classifiers of the domain-specific template to identify one or more relevant instances of the content, means for adding the one or more identified relevant instances of the content to a contextual protocol package, means for analyzing each identified relevant instance of the content based on the one or more classifiers of the domain-specific template to identify one or more additional relevant instances of the content, and means for adding the one or more identified additional relevant instances of the content to the contextual protocol package.

Another example system of any preceding system is provided, wherein the means for analyzing the collection starting point includes means for analyzing the collection starting point based on the one or more classifiers of the domain-specific template to identify one or more instances of the content and means for evaluating each identified instance of the content against one or more relevancy conditions to identify the one or more relevant instances of the content.

Another example system of any preceding system is provided, wherein the means for analyzing each identified relevant instance of the content includes means for analyzing each identified relevant instance of the content based on the one or more classifiers of the domain-specific template to identify one or more additional instances of the content and means for evaluating each identified additional instance of the content against one or more relevancy conditions to identify the one or more additional relevant instances of the content.

Another example system of any preceding system is provided, further including means for iterating through multiple stages of analyzing and adding directed to one or more additional instances of the content to identify an additional set of one or more additional relevant instances of the content and to add them to the contextual protocol package and means for terminating the iterating based on a determination that the one or more additional instances of the content identified in a stage of analyzing and adding failed to satisfy one or more relevancy conditions.

Another example system of any preceding system is provided, further including means for training the machine learning model using the contextual protocol package as training data.

Another example system of any preceding system is provided, further including means for indexing the contextual protocol package and training the machine learning model using the indexed contextual protocol package as training data.

Another example system of any preceding system is provided, further including means for receiving a query directed to the query domain and means for submitting the query to the machine learning model, wherein the machine learning model is trained using the contextual protocol package generated based on the domain-specific template.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of collecting data from a network graph, wherein the collected data is useful for training a machine learning model on a query domain, the method comprising:

receiving a domain-specific template corresponding to the query domain, the domain-specific template defining one or more classifiers to guide collection of content relevant to the query domain from the network graph, wherein each of the one or more classifiers are parameterized to evaluate content using a hardware-processor-implemented matching based on a type of data source and a weight applied to the type of the data source to set a relevancy condition for the type of the data source;

analyzing a collection starting point in a first data source represented in the network graph based on the one or more classifiers of the domain-specific template to identify one or more relevant instances of the content from the first data source, wherein each of the one or more classifiers are configured to classify whether instances of the content from the first data source satisfy the relevancy condition corresponding to the type of the first data source;

adding the one or more identified relevant instances of the content to a contextual protocol package;

navigating through the network graph using a hardware-processor-implemented crawler to a second data source based on content pointers corresponding to the one or more identified relevant instances of the first data source;

analyzing one or more instances of content identified in the second data source by the content pointers based on the one or more classifiers of the domain-specific template to identify one or more additional relevant instances of the content from the second data source, wherein each of the one or more classifiers is configured to classify whether instances of the content from the second data source satisfy the relevancy condition corresponding to the type of the second data source; and adding the one or more identified additional relevant instances of the content to the contextual protocol package.

2. The method of claim 1, wherein the operation of analyzing the collection starting point comprises:

analyzing the collection starting point based on the one or more classifiers of the domain-specific template to identify one or more instances of the content in the first data source; and evaluating each identified instance of the content against one or more relevancy conditions to determine the second data source and identify the one or more identified relevant instances of the content in the first data source.

3. The method of claim 1, wherein the operation of analyzing one or more instances of content identified in the second data source by the content pointers comprises:

analyzing each instance of the content identified in the second data source based on the one or more classifiers of the domain-specific template to identify one or more additional instances of the content in the second data source; and evaluating each identified additional instance of the content against one or more relevancy conditions to identify the one or more additional relevant instances of the content in the second data source.

4. The method of claim 1, further comprising:

iterating through multiple stages of analyzing and adding directed to one or more additional instances of the content to determine a third data source represented in the network graph and identify an additional set of one or more additional relevant instances of the content in the third data source and to add them to the contextual protocol package; and terminating the iterating based on a determination that the one or more additional instances of the content identified in a stage of analyzing and adding failed to satisfy one or more relevancy conditions.

5. The method of claim 1, further comprising:

training the machine learning model using the contextual protocol package as training data.

6. The method of claim 1, further comprising:

indexing the contextual protocol package; and training the machine learning model using the indexed contextual protocol package as training data.

7. The method of claim 1, further comprising:

receiving a query directed to the query domain; and submitting the query to the machine learning model, wherein the machine learning model is trained using the contextual protocol package generated based on the domain-specific template.

8. A system for collecting data from a network graph, wherein the collected data is useful for training a machine learning model on a query domain, the system comprising:

one or more hardware processors;

a template reader executable by the one or more hardware processors and configured to read a domain-specific template corresponding to the query domain, the domain-specific template defining one or more classifiers to guide collection of content relevant to the query domain from the network graph, wherein each of the one or more classifiers are parameterized to evaluate content using a hardware-processor-implemented matching based on a type of data source and a weight applied to the type of the data source to set a relevancy condition for the type of the data source;

a collector executable by the one or more hardware processors and configured to analyze a collection starting point in a first data source in the network graph based on the one or more classifiers of the domain-specific template to identify one or more relevant instances of the content from the first data source, wherein each of the one or more classifiers are configured to classify whether instances of the content from the first data source satisfy the relevancy condition corresponding to the type of the first data source, the collector being further configured to navigate through the network graph using a hardware-processor-implemented crawler to a second data source based on content pointers corresponding to the one or more identified relevant instances of the first data source and to analyze one or more instances of content identified in the second data source by the content pointers based on the one or more classifiers of the domain-specific template to identify one or more additional relevant instances of the content from the second data source, wherein each of the one or more classifiers is configured to classify whether instances of the content from the second data source satisfy the relevancy condition corresponding to the type of the second data source; and a packager executable by the one or more hardware processors and configured to add the one or more identified relevant instances of the content to a contextual protocol package and to add the one or more identified additional relevant instances of the content to the contextual protocol package.

9. The system of claim 8, wherein the collector is configured to analyze the collection starting point based on the one or more classifiers of the domain-specific template to determine the second data source and identify one or more instances of the content in the first data source and to evaluate each identified instance of the content against one or more relevancy conditions to identify the one or more identified relevant instances of the content in the first data source.

10. The system of claim 8, wherein the collector is configured to analyze each instance of the content identified in the second data source based on the one or more classifiers of the domain-specific template to identify one or more additional instances of the content in the second data source and to evaluate each identified additional instance of the content against one or more relevancy conditions to identify the one or more additional relevant instances of the content in the second data source.

11. The system of claim 8, wherein the collector is further configured to iterate through multiple stages of analyzing and adding directed to one or more additional instances of the content to determine further data sources represented in the network graph and identify an additional set of one or more additional relevant instances of the content from the further data sources and to add them to the contextual protocol package and to terminate the iterating based on a determination that the one or more additional instances of the content identified in a stage of analyzing and adding failed to satisfy one or more relevancy conditions.

12. The system of claim 8, further comprising:
a trainer executable by the one or more hardware processors and configured to train the machine learning model using the contextual protocol package as training data.

13. The system of claim 8, further comprising:
an indexer executable by the one or more hardware processors and configured to index the contextual protocol package; and
a trainer executable by the one or more hardware processors and configured to train the machine learning model using the indexed contextual protocol package as training data.

14. The system of claim 8, further comprising:
a query processor executable by the one or more hardware processors and configured to receive a query directed to the query domain and to submit the query to the machine learning model, wherein the machine learning model is trained using the contextual protocol package generated based on the domain-specific template.

15. One or more hardware tangible processor-readable storage media embodied with instructions for executing on one or more processors and circuits of a computing device a process for collecting data from a network graph, wherein the collected data is useful for training a machine learning model on a query domain, the process comprising:
receiving a domain-specific template corresponding to the query domain, the domain-specific template defining one or more classifiers to guide collection of content relevant to the query domain from the network graph, wherein each of the one or more classifiers are parameterized to evaluate content using a hardware-processor-implemented matching based on a type of data source and a weight applied to the type of the data source to set a relevancy condition for the type of the data source;
analyzing a collection starting point in a first data source represented in the network graph based on the one or more classifiers of the domain-specific template to identify one or more relevant instances of the content from the first data source, wherein each of the one or more classifiers are configured to classify whether instances of the content from the first data source satisfy the relevancy condition corresponding to the type of the first data source;
adding the one or more identified relevant instances of the content to a contextual protocol package;
navigating through the network graph using a hardware-processor-implemented crawler to a second data source based on content pointers corresponding to the one or more identified relevant instances of the first data source;
analyzing one or more instances of content identified in the second data source by the content pointers based on the one or more classifiers of the domain-specific template to identify one or more additional relevant instances of the content from the second data source, wherein each of the one or more classifiers is configured to classify whether instances of the content from the second data source satisfy the relevancy condition corresponding to the type of the second data source; and
adding the one or more identified additional relevant instances of the content to the contextual protocol package.

16. The one or more hardware tangible processor-readable storage media of claim 15, wherein the operation of analyzing the collection starting point comprises:
analyzing the collection starting point based on the one or more classifiers of the domain-specific template to identify one or more instances of the content in the first data source; and
evaluating each identified instance of the content against one or more relevancy conditions to identify the one or more identified relevant instances of the content in the first data source.

17. The one or more hardware tangible processor-readable storage media of claim 15, wherein the operation of analyzing one or more instances of content identified in the second data source by the content pointers comprises:
analyzing each instance of the content identified in the second data source based on the one or more classifiers of the domain-specific template to identify one or more additional instances of the content in the second data source; and
evaluating each identified additional instance of the content against one or more relevancy conditions to identify the one or more additional relevant instances of the content in the second data source.

18. The one or more hardware tangible processor-readable storage media of claim 15, wherein the process further comprises:
iterating through multiple stages of analyzing and adding directed to one or more additional instances of the content to determine further data sources represented in the network graph and identify an additional set of one or more additional relevant instances of the content from the further data sources and to add the additional set of one or more additional relevant instances of the content to the contextual protocol package; and terminating the iterating based on a determination that the one or more additional instances of the content identified in a stage of analyzing and adding failed to satisfy one or more relevancy conditions.

19. The one or more hardware tangible processor-readable storage media of claim 15, wherein the process further comprises:

training the machine learning model using the contextual protocol package as training data.

20. The one or more hardware tangible processor-readable storage media of claim 15, wherein the process further comprises:

receiving a query directed to the query domain; and submitting the query to the machine learning model, wherein the machine learning model is trained using the contextual protocol package generated based on the domain-specific template.

\* \* \* \* \*